United States Patent [19]

Cooper et al.

[11] 4,123,676
[45] Oct. 31, 1978

[54] ROTOR MEMBER FOR SUPERCONDUCTING GENERATOR

[75] Inventors: Glenn D. Cooper, North Huntingdon; Donald C. Litz, Murrysville, both of Pa.

[73] Assignee: Westinghouse Electric Corp., Pittsburgh, Pa.

[21] Appl. No.: 734,943

[22] Filed: Oct. 22, 1976

[51] Int. Cl.² ............................................. H02K 9/00
[52] U.S. Cl. .................................................. 310/52
[58] Field of Search .................... 310/10, 52, 40, 54, 310/64, 261

[56] References Cited

U.S. PATENT DOCUMENTS

| | | | |
|---|---|---|---|
| 3,644,766 | 2/1972 | Hughes | 310/40 |
| 3,648,082 | 3/1972 | MacNab | 310/54 |
| 3,679,920 | 7/1972 | MacNab | 310/10 |
| 3,942,053 | 3/1976 | Abolins | 310/10 |
| 3,956,648 | 5/1976 | Kirtley | 310/10 |
| 3,999,091 | 12/1976 | Kirtley | 310/40 |
| 4,017,755 | 4/1977 | Litz | 310/52 |

Primary Examiner—R. Skudy
Attorney, Agent, or Firm—G. H. Telfer

[57] ABSTRACT

A rotor is provided for an alternating current generator carrying a superconducting field winding and having a combined damper and shield member comprising a cylindrical member of high electrical conductivity. The shield member is attached to the rotor only at the end opposite the drive shaft and is supported on the rotor at the drive end in a manner to permit relative movement between the shield and the support.

3 Claims, 3 Drawing Figures

ROTOR MEMBER FOR SUPERCONDUCTING GENERATOR

BACKGROUND OF THE INVENTION

The present invention relates to superconducting generators, and more particularly to a combined damper and shield for generator rotors having superconducting field windings.

Large alternating current generators with superconducting field windings offer great potential benefits. Such machines operate with no losses in the field winding itself and thus can provide higher magnetic fields than conventional generators and with greater efficiency. This allows the generation of more power per unit volume of the generator and thus makes it possible to achieve greatly increased ratings or to reduce substantially the size and cost of a machine of given rating. The reduction in electrical losses during operation of the machine is also an important advantage and represents a very substantial saving in operating cost.

Such machines have rotating field members consisting of a cylindrical rotor with the field winding disposed in slots in its surface. The field winding conductors are made of superconducting material and means are provided for circulating a cryogenic coolant fluid during operation of the machine to maintain the winding in the superconducting state, that is, at a temperature below the critical temperature of the material. An external refrigeration system is provided for this purpose to supply liquid helium to the winding during operation, the helium exhausting in the gaseous state for return to the refrigerator.

In such a rotor, it is necessary to protect the superconducting field winding from alternating current magnetic fields in the air gap of the machine which may be caused by harmonics in the armature magnetomotive force and by unbalanced loads on the generator. Such fields, as well as the large transient fields that may occur during faults, could cause large eddy current losses in the field winding and produce sufficient heat to result in loss of superconductivity. Shielding is, therefore, required to protect the winding and can be provided by a cylindrical shield of high electrical conductivity surrounding the rotor and rotating with it. During disturbances on the system to which the generator is connected, the rotor will tend to oscillate at a low frequency about its steady-state torgue angle and damping must be provided to attenuate these oscillations in order to return to steady-state operation. This damping function can be performed by the same high-conductivity cylindrical member, which thus performs the two functions of damping and shielding.

The mechanical design of such a combined damper-shield presents difficult problems. The shield must have high electrical conductivity and it must also have sufficient mechanical strength to withstand the large forces to which it is subjected under fault conditions. In addition, the damper-shield and the rotor must be capable of withstanding the extremely high torques that may occur during a fault and the drive shaft which drives the rotor should be protected against these dangerously high torques. The damper-shield must also be mounted on the rotor in a manner which permits relative movement to allow for the differential thermal contraction of the rotor body when it is cooled to cryogenic temperature for operation, and to permit some relative axial movement between the damper-shield cylinder and the rotor body which results from different bending deflections during operation.

SUMMARY OF THE INVENTION

The present invention provides a construction for rotors having a superconducting field winding which includes a combined damper-shield member mounted on the rotor in a manner to meet the requirements outlined above.

More specifically, a damper-shield member is provided consisting of a cylinder of high electrical conductivity and high mechanical strength surrounding the rotor body and radially spaced therefrom. The damper-shield is rigidly attached to the rotor body only at the end of the rotor opposite the drive end. In this way, when high torques are applied to the shield under fault conditions, the torsional flexibility of the rotor body is interposed between the shield and the drive shaft, so that the torque is attenuated and the drive shaft is protected from excessive or dangerous torques. The other end of the damper-shield is supported on the rotor body adjacent the drive end in a manner to permit relative movement. The shield is supported on a cylindrical surface engaging the inner surface of the shield and preferably made of a bearing material to facilitate sliding movement between the support and the shield. The engagement is such as to permit such movement when the rotor is at standstill or operating at very low speed, to allow the necessary differential contraction when the rotor body is being cooled to cryongenic temperatures, and also permits relative movement under very high forces such as may occur during fault conditions. Sufficient flexibiltiy is included in both the attaching and the support means to allow the necessary small relative axial motion due to the different bending deflections of the rotor body and of the shield during operation. In this way, a very effective damper-shield is provided for protection of the field winding and for the necessary damping, and which also meets the difficult mechanical requirements.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
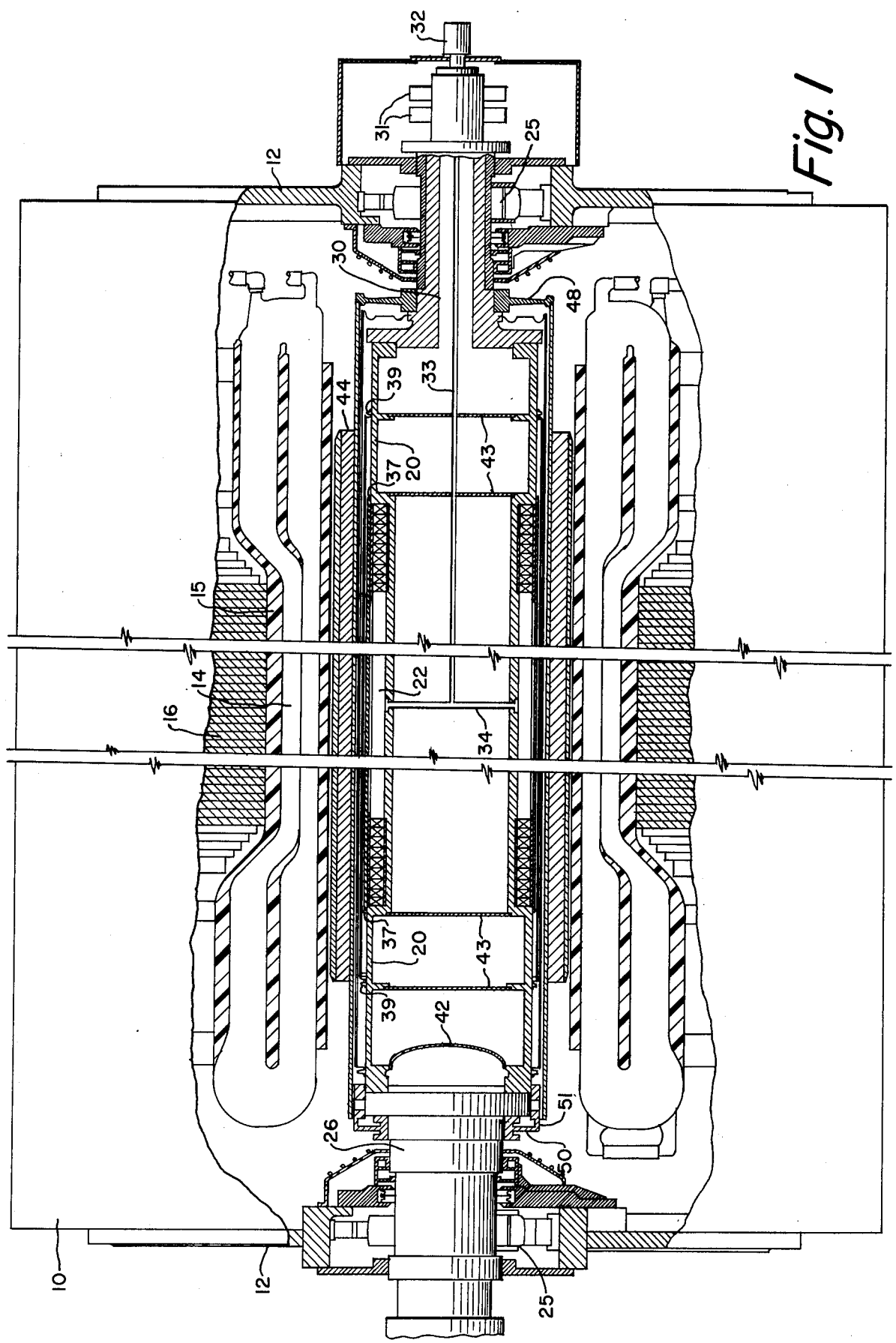
FIG. 1 is a side view of a generator embodying the invention with the housing partly broken away.
Figure 2:
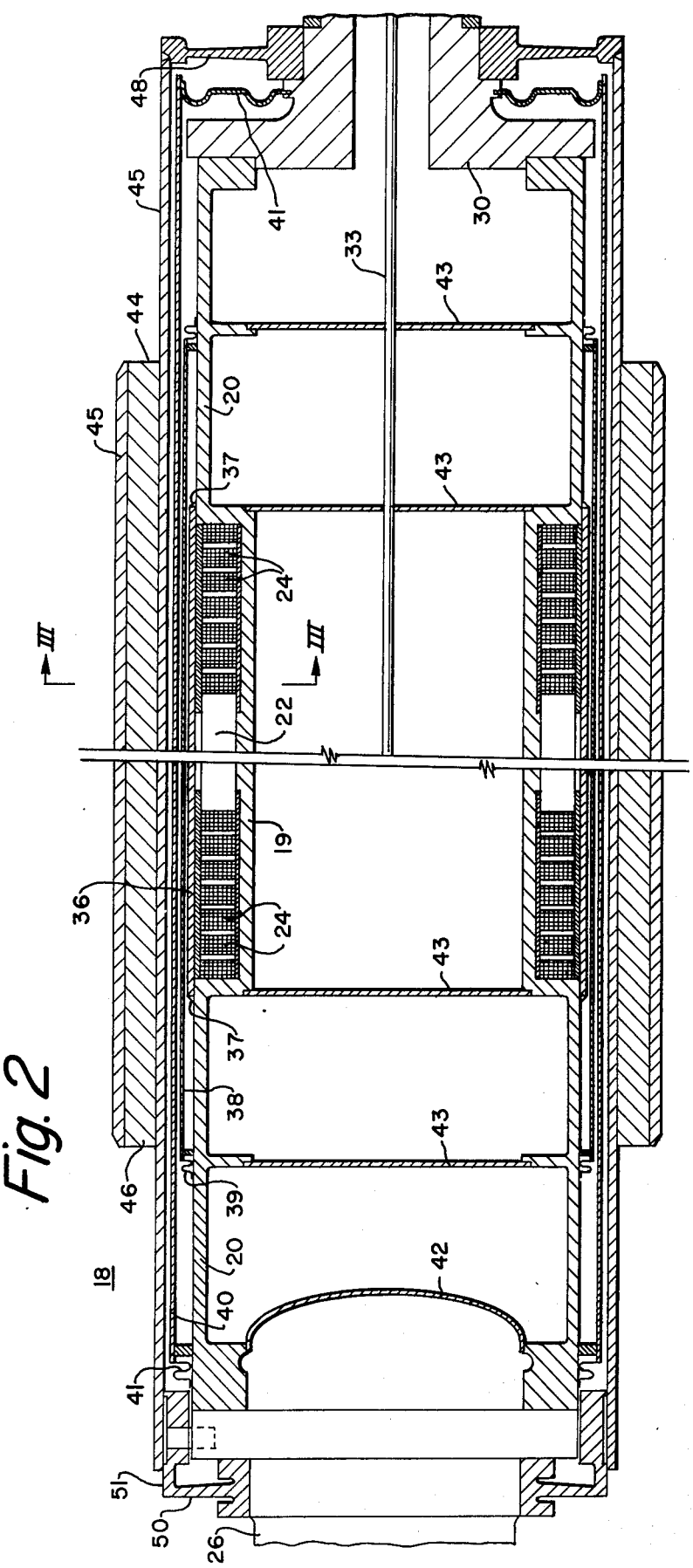
FIG. 2 is an enlarged side view of the rotor member of the machine of FIG. 1.
Figure 3:
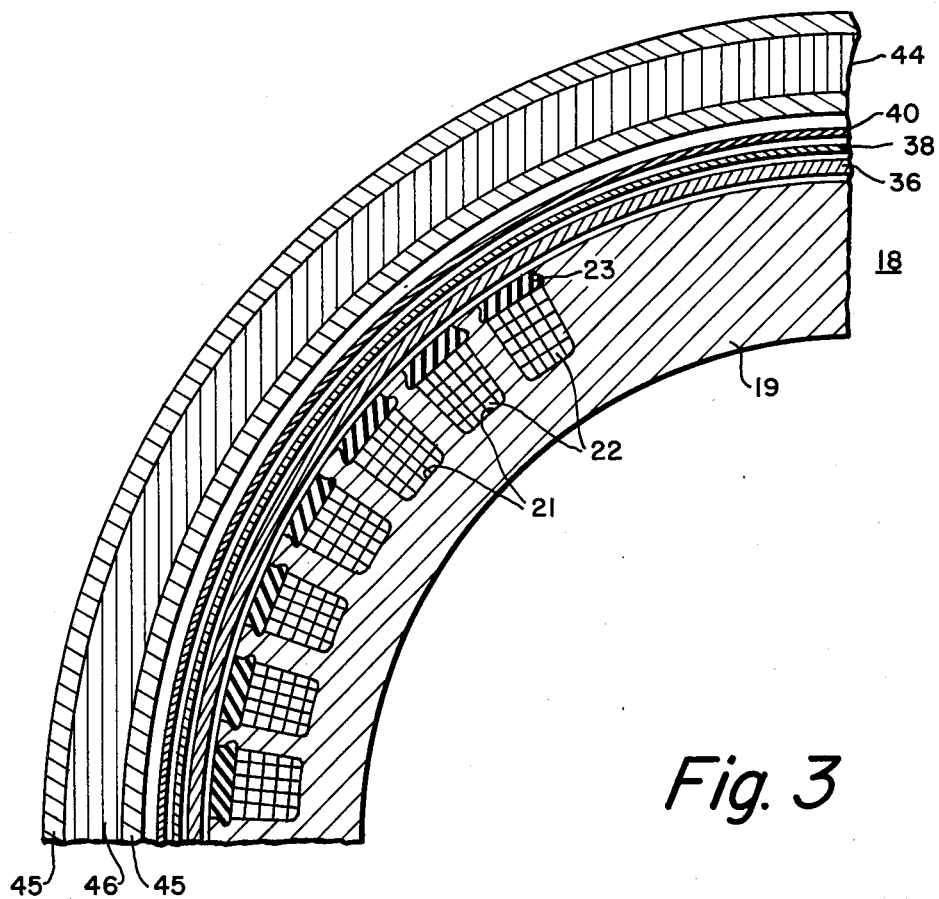
FIG. 3 is a transverse sectional view of the rotor substantially on the line III—III of FIG. 2.

The invention is shown in the drawings embodied in a rotor for a large superconducting alternating current machine such as a turbine generator. The stator and housing of the machine may be of any suitable or desired construction. As shown, the machine has a gastight housing 10 closed at the ends by bearing brackets 12. The stator member includes an armature winding 14 of any suitable type, shown as an air gap winding of cylindrical configuration embedded in a monolithic insulating body 15. The armature winding 14 is supported in a laminated magnetic shield 16 surrounding the winding and suitably supported in the housing 10. The construction of the stator member may be of any suitable type and has not been shown in detail as it is not a part of the present invention. The housing 10 is filled with a coolant gas which is preferably helium because it is non-inflammable and a supply of helium will be required in any event for cooling the rotor. The armature winding 14 and the magnetic shield 16 may additionally be water-cooled, if desired.

The rotor 18 consists of a hollow cylindrical rotor body 19 of a suitable material, such as a nonmagnetic nickel alloy. The rotor body 29 terminates at each end in torque tube portions 20 having a wall thickness which is adequate to transmit the required torque but thin enough and long enough to minimize heat flow into the cryogenic portion of the rotor. The central body portion 19 of the rotor has longitudinal slots 21 in which the field windings 22 are placed and retained in position by wedges 23. The field windings 22 are made of any suitable superconducting material such as multifilamentary conductors of niobium-titanium alloy in a copper or copper-nickel matrix. Such conductors are known in the art and are available but any suitable superconductive material could be utilized. The windings 22 are arranged in the slots 21 in any suitable or desired manner to form a field winding with circumferential end turns 24 at each end of the rotor body 19.

The rotor 18 is provided with shaft portions at each end thereof supported in suitable bearings 25 in the end brackets 12. The shaft portion 26 at the left-hand end in FIG. 1 is a drive shaft connected in any suitable manner to the end of the torque tube 20 to drive the rotor 18. The shaft portion 30 at the opposite end is not required to transmit any substantial torque and can, therefore, be of smaller diameter as shown. The shaft portion 30 carries collector rings 31 at its outer extremity for supplying excitation current to the field winding 22 through suitable leads from an external exciter of any suitable type. The shaft portion 30 is made hollow to provide for entrance of the cryogenic coolant fluid for the superconducting field winding. Any suitable type of cooling system may be utilized in which liquid helium is supplied from an external refrigeration system. As shown, the liquid helium is introduced into the rotor through a port assembly 32 to a passage 33 on the axis of the rotor. The passage 33 extends to the center of the rotor and the coolant flow radially through a heat exchanger 34 into coolant passages in the winding 22 and flows in opposite directions toward the ends of the rotor. The helium gas discharged from the winding 22 may be utilized for other cooling purposes on the rotor, such as for cooling the torque tubes 20 and the field winding leads, and is finally exhausted through the hollow shaft portion 30 and discharged from the machine through the port assembly 32 for return to the refrigerator. It will be understood, of course, that any suitable coolant or cooling system may be utilized to keep the windings 22 at superconducting temperature during operation of the machine.

A retaining ring or field enclosure 36 is shrunk on the rotor body. This enclosure is a cylindrical steel tube which extends over the rotor body past the end turns 24 of the field winding at each end and is shrunk onto the rotor body so as to retain the field winding end turns in position. The enclosure 36 also serves to contain the helium coolant and, therefore, is seal-welded at each end to the rotor body 19 as indicated at 37. A radiation shield 38 is provided outside the enclosure 36 to protect the cryogenic portions of the rotor body from thermal radiation. The shield 38 may be a thin tubular sheet metal member and is welded or otherwise attached to the rotor body 19 beyond the ends of the enclosure 36, as indicated at 39, at least one of the connections 39 including sufficient flexibility to permit differential longitudinal expansion and contraction. A vacuum shell 40 is disposed outside of the radiation shield 38. The vacuum shell 40 may also be a thin sheet metal cylinder surrounding the rotor body and radially spaced from the radiation shield. The vacuum shell 40 extends axially beyond the radiation shield and is attached at one end to the rotor body and at the other end to the shaft portion 30 with bellows-type seals 41. A similar vacuum seal 42 closes the drive end of the hollow rotor body. The vacuum shell 40, with the seals 41 and 42, forms a vacuum-tight enclosure and the rotor is evacuated within this enclosure. Radiation shields 43 within the rotor complete the cryogenic zone.

As previously mentioned, it is necessary to protect the superconducting field winding 22 from losses caused by alternating current magnetic fields in the air gap. Steady-state fields of this kind may be caused by spatial harmonics in the armature magnetomotive force and by unbalanced loads on the generator which cause rotating fields in the air gap. Large transient fields may also occur during faults and system disturbances on the system to which the generator is connected. Many of these fields, if allowed to penetrate the field winding, could cause sufficient heating due to eddy current losses to result in loss of superconductivity of the winding which would require immediate shut-down of the machine. For this reason, the winding must be shielded from magnetic fields in the air gap which can be done by means of a cylindrical metal shield surrounding the rotor and of sufficient thickness to provide the necessary shielding by attenuation of the fields. The rotor also requires damping because of its tendency to oscillate at a low frequency of the order of 1 to 3 Hz about its steady-state torque angle during disturbances on the system. These oscillations must be attenuated by suitable damping in order for the rotor to return to steady-state operation. The two functions of shielding and damping can both be performed by a single cylindrical member of high electrical conductivity carried on the rotor.

For this purpose, a combined damper and shield 44 is provided. This damper-shield must meet numerous requirements. It must provide the necessary electromagnetic shielding to protect the field winding from alternating fields in the air gap, as discussed above, and must be capable of dissipating the heat generated by the steady-state shielding currents induced by such fields as well as having sufficient thermal capacity to absorb the heat resulting from the high currents induced during faults or by large load unbalance. The shield must also be capable of providing the necessary damping to minimize rotor oscillations during system disturbances. The shield must have sufficient mechanical strength to withstand the large torques and high radial stresses or crushing forces which occur under fault conditions. In addition, it must be mounted on the rotor in a manner that allows large differential thermal expansion and contraction due to the great temperature difference between the shield and the cryogenic portions of the rotor, and which is capable of absorbing axial motions caused by the different flexural stiffnesses of the rotor components.

The damper-shield 44 shown in the drawings is mounted on the rotor in a manner to meet these requirements. The shield itself may be of any suitable construction but is preferably a composite cylindrical structure of the type disclosed and claimed in our copending application Ser. No. 734,941, filed 10/22/76, and assigned to the Assignee of the present invention. As there are more fully disclosed, the damper-shield 44 consists of inner and outer cylindrical members 45 of a non-magnetic material of high mechanical strength, such as a nickel alloy, and an intermediate cylinder 46 of a highly conductive material such as aluminum or copper. The damper-shield 44 is made of sufficient radial thickness to have the necessary high electrical conductivity and thermal capacity and to provide the necessary mechanical strength. The shield is spaced radially from the rotor body to avoid any possibility of rubbing and extends axially at least over the full length of the field winding. In the illustrated embodiment, the inner cylindrical member 45 extends to the ends of the rotor body for supporting the shield.

Under fault conditions, very high air gap torques may occur which are applied to the damper-shield because of its location in the air gap. At the initiation of a fault, the maximum torque may be as high as ten times rated torque, for example. The shield and rotor can be designed to withstand these high torques, but such torques would be dangerous to the generator drive shaft and to the shaft of the driving turbine. These high fault torques, therefore, cannot be transmitted directly to the drive shaft without serious risk of damaging or breaking the generator shaft or the turbine shaft.

In accordance with the invention, the drive shaft is protected from excessive torques by attaching the damper-shield 44 to the rotor only at the end opposite to the drive shaft 26. For this purpose, a disc 48 is keyed or otherwise secured to the shaft portion 30 beyond the end of the rotor body. The inner cylindrical member 45 of the damper-shield extends over the disc 48 and is welded or otherwise rigidly attached to the outer periphery of the disc. The damper-shield 44 is thus rigidly attached to the rotor at the end opposite the drive shaft. At the other or drive end, a collar having a radial flange 50 is carried on the drive shaft 26 adjacent the end of the rotor body, and the flange 50 carries a generally cylindrical support surface 51 which fits inside the end of the inner cylindrical member 45 of the damper-shield. The damper-shield 44 is thus supported on the rotor at the drive shaft end but is not attached to it. A sliding engagement which permits relative movement is thus provided between the rotor and the damper-shield at the drive end and, if desired, the support surface 51 may be made of or coated with a suitable bearing material such as bronze or a dry lubricant.

Upon the occurrence of high air gap torques applied to the damper-shiled 44, as under fault conditions, such torques will be transmitted to the rotor body through the shaft 30 at the end opposite the drive shaft. Since the rotor body is essentially a hollow cylinder or tube, it has a substantial amount of torsional flexibility and this flexibility is interposed between the damper-shield 44 and the drive shaft 26. The high instantaneous torques which can occur under fault conditions, therefore, are attenuated by the torsional flexibility of the rotor between the shield and the drive shaft and the torque is attenuated sufficiently in this way to protect the drive shaft by reducing the torque to a safe level. It can be shown that transient air gap torques of the order of 9 to 10 times normal torque can be attenuated in this way to about 1.5 times normal torque applied to the drive shaft.

The support of the damper-shield on the rotor at the drive end, as previously mentioned, allows both axial and circumferential relative movement between the shield and the rotor itself. These movements occur under different conditions. When the rotor is cooled down to cryogenic temperature, a relatively large longitudinal thermal contraction occurs relative to the shield which remains substantially at ambient temperature. Because of the extreme temperature difference involved, this contraction is quite large and the sliding support on the surface 51 permits this relative movement to take place with no mechanical problems. This normally occurs during initial cool-down of the rotor while it is at standstill or rotating at low speed, and the rotor is designed so that at low speed there is a light interference fit and low contact pressure between the end of the damper-shield and the support surface 51. At normal operating speed, the radial expansion of the member 51 caused by centrifugal force increases the contact pressure between the support 51 and the shield 44 and relative axial movement does not normally occur under these conditions. Under very high transient torque conditions discussed above, however, the torsional flexibility of the rotor results in curcumferential slippage between the damper-shield 44 and the support surface 51 to protect the drive shaft, and the high torques involved under these conditions are sufficient to cause the necessary slippage. The damper-shield is thus supported on the drive end of the rotor in a manner which permits relative movement when necessary but provides a stable and non-slipping support during normal operating conditions.

The rotor body 19 has a smaller diameter than the damper-shield 44 and, therefore, will have a slightly greater bending deflection during operation. This results in a slight relative axial motion between the two at a frequency of once per revolution. While this is a very small motion, of the order of a few thousandths of an inch, it is sufficient to cause fretting, and to absorb this motion, the discs 48 and 50 are made thin enough to have a small amount of axial flexibility. This absorbs the relative axial motion between the rotor and the damper-shield and thus eliminates any difficulty due to this motion.

It will now be apparent that a combined damper and shield member has been provided for a generator having a superconducting field winding which satisfactorily meets meets all of the difficult requirements for such a member. That is, the shield provides effective electromagnetic shielding of the superconducting winding from alternating current fields in the air gap as well as providing the required damping for attenuating oscillations of the rotor. The mechanical construction is such that the generator drive shaft is protected from excessive transient torques under fault conditions by the torsional flexibility of the rotor, while the damper-shield is adequately supported on the rotor in a manner to allow the necessary movements due to thermal contraction and expansion of the rotor.

What is claimed is:

1. A rotor for a dynamoelectric machine comprising a hollow cylindrical rotor body carrying a field winding of superconducting material, means for circulating a cryogenic coolant fluid through said field winding, shaft portions at opposite ends of the rotor body, one of said shaft portions being a drive shaft, a cylindrical radiation shield surrounding the rotor body concentrically therewith and attached to the rotor at the ends of the radiation shield, a cylindrical vacuum enclosure disposed concentrically with the rotor body outside the radiation shield and spaced radially therefrom, the vacuum enclosure being attached to the rotor adjacent each end thereof with a sealing attachment and the space within the enclosure being evacuated, a cylindrical damper-shield member of high electrical conductivity surrounding the rotor body concentrically therewith outside the vacuum enclosure and spaced radially therefrom, means for rigidly attaching said shield member to the rotor at the end thereof opposite said drive shaft, and means for supporting the shield member on the rotor at the end adjacent the drive shaft.

2. A rotor as defined in claim 1 in which said supporting means includes a support member having a cylindrical bearing surface engaging the shield member in a manner to permit relative movement between the shield member and the rotor when the rotor is at standstill or under high torque conditions.

3. A rotor as defined in claim 2 in which the supporting means and the attaching means for the shield member provide sufficient flexibility to permit relative axial movement between the shield member and the rotor.

* * * * *